United States Patent
Decrop et al.

(10) Patent No.: US 11,488,634 B1
(45) Date of Patent: Nov. 1, 2022

(54) GENERATING VIDEO SUMMARIES BASED ON NOTES PATTERNS

(71) Applicant: INTERNATIONAL BUSINESS MACHINES CORPORATION, Armonk, NY (US)

(72) Inventors: Clement Decrop, Arlington, VA (US); Jacob Ryan Jepperson, St. Paul, MN (US); Spencer Thomas Reynolds, Austin, TX (US); Zachary A. Silverstein, Austin, TX (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/337,970

(22) Filed: Jun. 3, 2021

(51) Int. Cl.
| | |
|---|---|
| *G11B 27/00* | (2006.01) |
| *H04N 5/93* | (2006.01) |
| *G11B 27/028* | (2006.01) |
| *H04N 9/80* | (2006.01) |
| *H04L 12/18* | (2006.01) |

(52) U.S. Cl.
CPC ........ *G11B 27/028* (2013.01); *H04L 12/1831* (2013.01)

(58) Field of Classification Search
USPC .................................................. 386/248, 278
See application file for complete search history.

(56) References Cited

U.S. PATENT DOCUMENTS

| | | | |
|---|---|---|---|
| 7,298,930 B1 * | 11/2007 | Erol ....................... | G06V 20/40 |
| | | | 707/999.001 |
| 8,739,046 B2 * | 5/2014 | Sloyer ................... | G06Q 10/10 |
| | | | 709/204 |
| 9,792,502 B2 | 10/2017 | Newman | |
| 9,875,225 B1 * | 1/2018 | Grueneberg ......... | H05K 999/99 |
| 9,888,279 B2 | 2/2018 | Ishtiaq | |
| 10,460,030 B2 * | 10/2019 | D'Souza ................ | G06V 10/25 |

(Continued)

FOREIGN PATENT DOCUMENTS

| | | | | |
|---|---|---|---|---|
| CN | 101960753 B | 1/2011 | | |
| WO | WO-2007129246 A1 * | 11/2007 | ........... | G06F 16/739 |

OTHER PUBLICATIONS

Ar, "Introducing Meeting Notes: take notes during online meetings," Zoho.com, Zoho Blog, May 19, 2020, Retrieved from the Internet: https://www.zoho.com/blog/notebook/introducing-meeting-notes-take-notes-during-online-meetings. html, 8 pages.

(Continued)

*Primary Examiner* — Nigar Chowdhury
(74) *Attorney, Agent, or Firm* — Steven M. Bouknight

(57) ABSTRACT

A method, computer system, and a computer program product for generating a summary video from a plurality of presentation attendee notes is provided. Embodiments of the disclosure may include collecting the plurality of attendee notes from a plurality of attendees of a presentation and then analyzing the collected plurality of notes to identify a plurality of common note topics. The identified plurality of common note topics may be correlated to a plurality of portions in a presentation video of the presentation which is used to generate the summary video by combining the correlated plurality of portions in the presentation video.

17 Claims, 5 Drawing Sheets

(56) References Cited

U.S. PATENT DOCUMENTS

| | | | |
|---|---|---|---|
| 10,515,561 B1 | 12/2019 | Fieldman | |
| 10,862,841 B1* | 12/2020 | Pulicharla | G06F 16/908 |
| 11,095,468 B1* | 8/2021 | Pandey | G06F 16/345 |
| 11,170,465 B1* | 11/2021 | Feimster | H04N 5/2224 |
| 2008/0189624 A1* | 8/2008 | Chotai | H04L 65/403 |
| | | | 348/E7.083 |
| 2012/0191500 A1* | 7/2012 | Byrnes | G06Q 10/1095 |
| | | | 705/7.19 |
| 2012/0209906 A1* | 8/2012 | Ausfeld | H04L 43/08 |
| | | | 709/204 |
| 2013/0030872 A1* | 1/2013 | Oksman | G06Q 30/02 |
| | | | 705/7.36 |
| 2013/0159414 A1* | 6/2013 | Zhou | H04L 65/4084 |
| | | | 709/204 |
| 2014/0146676 A1* | 5/2014 | Howes | H04L 47/2441 |
| | | | 370/235 |
| 2014/0282089 A1* | 9/2014 | West | G06F 16/683 |
| | | | 715/753 |
| 2014/0349271 A1* | 11/2014 | Beavers | G09B 7/07 |
| | | | 434/350 |
| 2015/0046370 A1* | 2/2015 | Libin | G06Q 10/10 |
| | | | 705/345 |
| 2015/0154291 A1* | 6/2015 | Shepherd | G06Q 10/101 |
| | | | 707/748 |
| 2015/0324756 A1* | 11/2015 | Hughes | G06Q 10/1095 |
| | | | 705/7.19 |
| 2016/0117624 A1* | 4/2016 | Flores | H04L 67/306 |
| | | | 705/7.39 |
| 2018/0285359 A1* | 10/2018 | Bostick | G06F 40/30 |
| 2019/0050406 A1* | 2/2019 | Nguyen | G06F 16/951 |
| 2019/0139543 A1* | 5/2019 | Rahmel | G10L 15/22 |
| 2019/0205128 A1* | 7/2019 | van Schaik | G06F 8/77 |
| 2019/0251638 A1* | 8/2019 | Braz | G06Q 10/107 |
| 2019/0266573 A1* | 8/2019 | Radhakrishnan | G06N 20/00 |
| 2019/0378076 A1* | 12/2019 | O'Gorman | H04M 3/56 |
| 2020/0082824 A1* | 3/2020 | Rahmel | G10L 15/08 |
| 2020/0090659 A1* | 3/2020 | Castelli | G06F 16/48 |
| 2020/0145240 A1* | 5/2020 | Jaber | G06Q 10/063116 |
| 2020/0202159 A1* | 6/2020 | Zhou | G06F 40/166 |
| 2020/0403816 A1* | 12/2020 | Daredia | G06V 40/164 |
| 2020/0403817 A1* | 12/2020 | Daredia | H04L 12/1822 |
| 2020/0403818 A1* | 12/2020 | Daredia | G06N 20/00 |
| 2020/0410998 A1* | 12/2020 | Bar-On | G10L 13/00 |
| 2021/0014287 A1* | 1/2021 | Kimball | H04L 65/403 |
| 2021/0157834 A1* | 5/2021 | Sivasubramanian | |
| | | | G06F 16/686 |
| 2021/0232542 A1* | 7/2021 | Dhanabalan | G06F 16/156 |
| 2021/0280198 A1* | 9/2021 | Nassar | G10L 15/26 |
| 2021/0306174 A1* | 9/2021 | van Rensburg | H04L 51/046 |
| 2021/0321396 A1* | 10/2021 | Li | H04L 1/1896 |
| 2021/0375291 A1* | 12/2021 | Zeng | G06F 16/535 |
| 2021/0383127 A1* | 12/2021 | Kikin-Gil | G06V 20/41 |
| 2022/0109585 A1* | 4/2022 | Asthana | G06F 40/35 |
| 2022/0179665 A1* | 6/2022 | Rathod | G06F 9/451 |

OTHER PUBLICATIONS

Disclosed Anonymously, "Conference Advisor System," IP.com, IP.com No. IPCOM000263877D, IP.com Publication Date: Oct. 14, 2020, 6 pages.

Disclosed Anonymously, "Personalized Meeting Summary Based on Participant Engagement Rate," IP.com, IP.com No. IPCOM000261382D, IP.com Publication Date: Feb. 27, 2020, 4 pages.

IBM, "Watson Natural Language Understanding—The natural language processing (NLP) service for advanced text analytics," IBM.com, [accessed Feb. 11, 2021], Retrieved from the Internet: https://www.ibm.com/cloud/watson-natural-language-understanding, 8 pages.

Konrad, "IBM Confirms Ustream Acquisition as Part of Cloud Video Unit Targeting "$105 Billion Opportunity"," Forbes.com, Jan. 21, 2016, Retrieved from the Internet: https://www.forbes.com/sites/alexkonrad/2016/01/21/ibm-confirms-ustream-acquisition-as-part-of-new-cloud-video-unit/?sh=20f5c7e6369a, 3 pages.

Mell et al., "The NIST Definition of Cloud Computing", Recommendations of the National Institute of Standards and Technology, NIST Special Publication 800-145, Sep. 2011, 7 pages.

* cited by examiner

GENERATING VIDEO SUMMARIES BASED ON NOTES PATTERNS

BACKGROUND

The present invention relates generally to the field of computing, and more particularly to dynamic video creation.

Large presentations or other meetings are venues in which large amounts of information may be communicated to large audiences. Oftentimes people who could not attend the meeting live may later wish to watch a recording of the meeting. For people in this situation, it may not make sense to watch the entire recording when only portions of the recording will be relevant to them.

SUMMARY

According to one exemplary embodiment, a method for generating a summary video from a plurality of presentation attendee notes is provided. The method may include collecting the plurality of attendee notes from a plurality of attendees of a presentation and then analyzing the collected plurality of notes to identify a plurality of common note topics. The identified plurality of common note topics may be correlated to a plurality of portions in a presentation video of the presentation which is used to generate the summary video by combining the correlated plurality of portions of the presentation video.

A computer system and computer program product corresponding to the above method are also disclosed herein.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
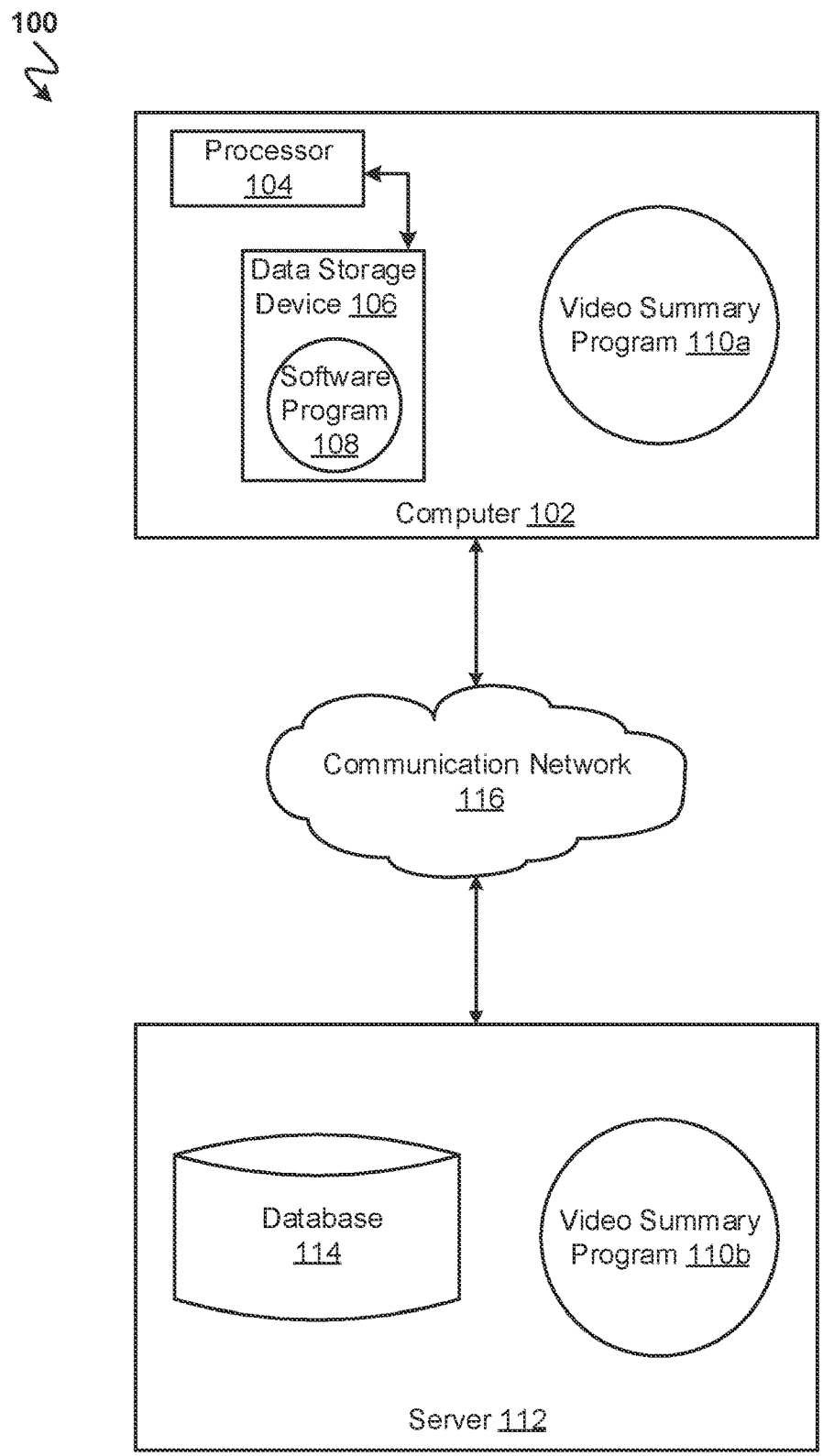
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

As described previously, large presentations or other meetings are venues in which large amounts of information may be communicated to large audiences. Oftentimes people who could not attend the meeting live may later wish to watch a recording of the meeting. For people in this situation, it may not make sense to watch the entire recording when only portions of the recording will be relevant to them. People who missed a meeting may resort to asking someone who attended for the highlights and taking this route may result in important omissions from the meeting or presentation. During presentations and meetings, notes are often taken by attendees recording important information brought up during the presentation.

Therefore, it may be advantageous to, among other things, provide a way to automatically generate condensed video summaries of recorded presentations that focus on important points covered in the presentation. More specifically, it may be advantageous to leverage notes already generated by attendees to identify important points during the presentation and use those identified points to generate a video summary of the presentation. It may be further advantageous to, in some embodiments, personalize the summaries to focus on areas of interest to specific individual viewers.

The following described exemplary embodiments provide a system, method and program product for automatically generating a video summary based on notes taken by attendees. As such, the present embodiment has the capacity to improve the technical field of dynamic video creation by leveraging attendee notes to determine the most important points of a presentation and generating a video exclusively correlated to the most important points. More specifically, notes taken by attendees are gathered and aggregated. Thereafter, the aggregated notes are analyzed for common topics and correlated to the appropriate portion of the video recording of the presentation. Then, a personalized video summary is generated of the top highlights.

According to at least one embodiment, a speaker or event coordinator configures the video summary system in conjunction with a planned presentation, keynote, all-hands meeting, or the like. Part of the configuration step may include file integration into any notes or files related with the material that will be covered in the presentation (e.g., presentation slides, video clips). Contextual analysis may then be performed on the notes or files using, for example, natural language processing (NLP) techniques to provide a contextual understanding of the presentation and notes. This may include bag of words (BoW) analysis to gather what topics will be discussed. Speech-to-text may be used to convert what the speaker says during the presentation to text for further analysis. Additionally, image analysis techniques, such as employing a convolutional neural network (CNN) may be used to identify content within video of the presentation for frame-by-frame analysis.

In embodiments, the presentation participants or attendees are given the option to opt-in to allow anonymous collection and analysis of their notes taken during the presentation. Additionally, metadata of the note-takers, such as profession, job title, position within an organization, and so forth may be collected while maintaining the anonymity of the note-takers.

Thereafter, notes are gathered from attendees who opted-in to the note collection. In embodiments, this may be done in real-time as the presentation occurs and the notes are written by attendees. The notes are time stamped for later correlation to the specific point in the presentation when the notes were generated. The common topics reflected in the notes are then identified and temporally grouped. Common topics may be identified based on various NLP algorithms such as BoW, capture classification, and other methods.

Next, common topics from the notes are correlated with content in the recording from the presentation. Correlation may be based on mapping topics to text, topics to images, or a combination of mapping. To map topics to text, the topics are correlated from the aggregated notes to results from the speech-to-text conversion earlier. For topic to image mapping, the topics are correlated from the aggregated notes to the results from, for example, the CNN object detection. Next, temporal analysis may determine the time that topics were record and embodied in notes and correlate those topics to the matching time in the recorded presentation that the notes reference. Uni-variant correlation may be used when the comment embodied in the notes correlates to only one portion of the video, and thus the system may proceed to snipping that portion of video for a summary. In the case where a comment correlates to potentially multiple portions of the video, then additional processing may be necessary. The additional processing for multi-variant correlation may include performing Term Frequency-Inverse Document Frequency (TF-IDF) to each correlation. TF-IDF measures the number of times that a categorized object/person/environment appears or is discussed in each correlated section of video. TF-IDF then measures relevance of each instance to derive which of the multi-variant correlations is most relevant to the video content.

After performing the above analysis and correlation, a personalized video summary may be generated. Based on the correlated notes, a summary may be made of the top highlights. In some embodiments, summary videos of various lengths may be generated (e.g., short, medium, and long videos for a person to choose how much detail they want in their summary). In some embodiments, the summary video may be personalized based on, for example, a person's role in an organization and generating a summary video that presents highlights derived from notes by individuals with similar backgrounds. To generate higher quality video summaries, wavelength profile analysis may be employed to determine gaps in audio waves of the video presentation in order to clip the video when the speaker is between statements (i.e., not snipping video midway through someone talking).

Finally, a feedback mechanism may be implemented that would observe what parts of the highlights or recording certain viewers watch to include in the highlight video. In some embodiments, if a specific part of the highlight video of the full recording is watched frequently (i.e., high frequency counts), then that part may be flagged to keep in highlights or add to the highlights of other videos. On the other hand, if a specific part of the highlight video or the full recording is seldom watched (i.e., low frequency counts), then that part may be removed from the highlight video. According to some embodiments, users may be provided with the opportunity to like, dislike, or otherwise indicate portions of the video the user or viewer liked or disliked (e.g., pressing a button during playback of the video summary may indicate that the viewer likes the portion being played currently). Based on the feedback generated, the summary highlight videos may be dynamic as parts are added and removed.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a video summary program 110a. The networked computer environment 100 may also include a server 112 that is enabled to run a video summary program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the video summary program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the video summary program 110a, 110b (respectively) to generate a condensed video summary based on analyzed presentation attendee notes. The video summary method is explained in more detail below with respect to FIG. 2.

Figure 2:
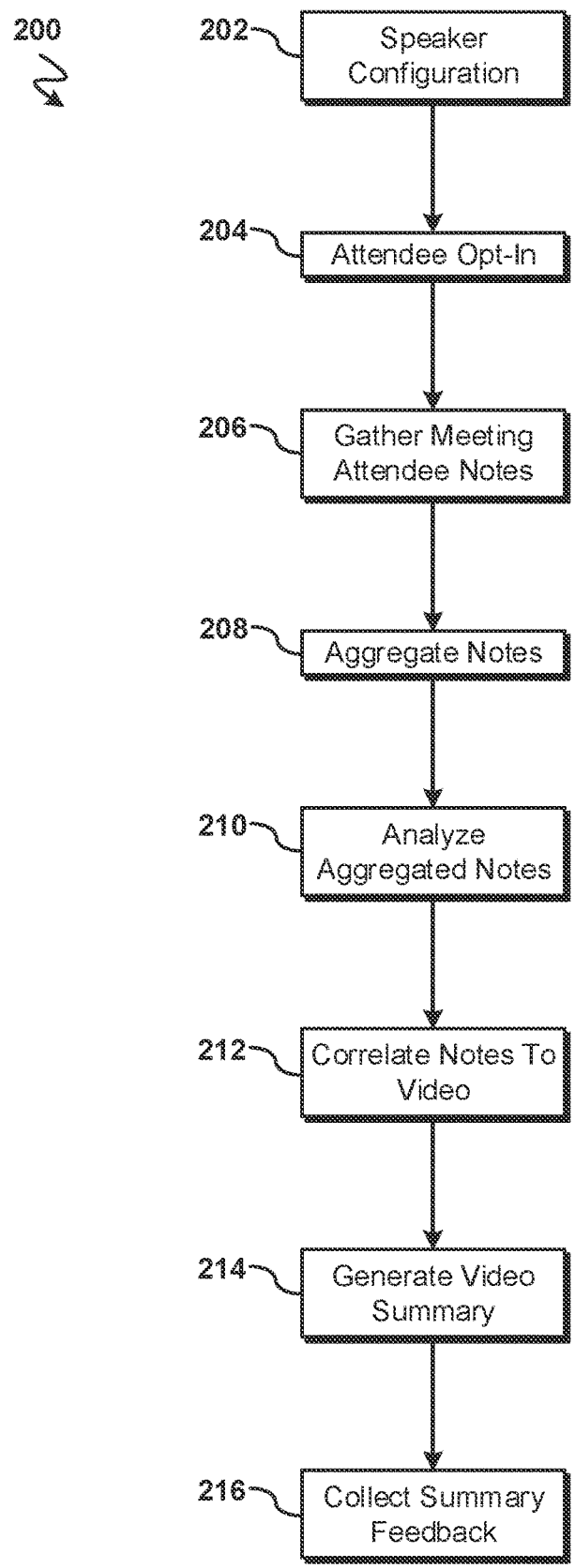
FIG. 2 is an operational flowchart illustrating a process for video summary generation according to at least one embodiment.

Referring now to FIG. 2, an operational flowchart illustrating the exemplary video summary generation process 200 used by the video summary program 110a and 110b according to at least one embodiment is depicted.

At 202 a user speaker configures the video summary generation process 200. According to at least one embodiment, a speaker or event coordinator configures the video summary generation process 200 in conjunction with a planned presentation, keynote meeting, or the like. In embodiments, configuration by the speaker may include integration with notes or files related with the material to be used for the presentation. In some implementations, the video summary generation process 200 may communicate with notes or presentation slide software via an application programming interface (API) to integrate with the aforementioned software. Once the video summary generation process 200 has been configured to integrate with note and presentation software, contextual analysis may be performed on the notes and other presentation materials to determine the topics that will be discussed and the order the topics will be discussed. Natural Language Processing (NLP) techniques may be employed to derive a contextual understanding of the presentation and notes. The NLP techniques may include one or more computer-based algorithms configured to derive meaning from natural language content. As examples, the NLP technique may include algorithms configured for part-of-speech tagging, parsing, relationship extraction, sentiment analysis, information retrieval, information extraction, morphological segmentation, and the like. This may, in some embodiments, further include Bag of Words (BoW) analysis to determine the topics of discussion. Additionally, the video summary generation process 200 may integrate with virtual meeting software to capture the audio of the speaker talking for speech-to-text conversion for later analysis. In some embodiments, video of the speaker and presentation may also be collected for image analysis. Image analysis algorithms may analyze the captured video to identify content in the collected video on, for example, a frame-by-frame basis using a Convolutional Neural Network (CNN). In other implementations the image analysis may include one or more other computer-based algorithms configured to extract meaningful information from images. As further examples, the image analysis algorithms may include 2D and 3D object recognition, image segmentation, motion detection, single particle tracking, video tracking, optical flow, and the like.

To integrate with the relevant software (e.g., notes software, slide presentation software, virtual meeting or presentation software), the video summary generation process 200 may, in some embodiments, present a graphical user interface (GUI) to the speaker with options to select for various programs to integrate with or specific files (e.g., .doc file text containing notes) for analysis.

For example, speaker Jan configures the video summary generation process 200 (via the video summary program 110a and 110b) in preparation for presenting an all-hands meeting. In order to configure the video summary generation process 200, Jan is presented with a GUI providing options for Jan to designate file locations for notes and presentation slides as well as indicate which of the virtual meeting applications she has installed will be used. Jan designates a .doc file, Presentation_Notes.doc as her reference notes for the presentation and All-Hands.pptx as her presentation slides. Jan then selects VirtuaMeeting as her virtual meeting software.

Next, at 204, meeting or presentation attendees are given the opportunity to opt-in to the video summary generation process 200. According to at least one embodiment, meeting attendees are given the option to opt-in to the video summary generation process 200 which may entail collecting the attendees' and analyzing the notes, as will be discussed below in further detail. As such, attendees may be presented with a GUI notification (e.g., dialog box) explaining that attendee notes and additional metadata may be collected, anonymized, and analyzed if the attendee approves. In embodiments, the GUI notification may include buttons or other elements which will allow the attendee to indicate approval, thereby opting-in, or decline, and the video summary generation process 200 will not collect notes or other data regarding any attendee that declines.

If the attendee opts-in, additional metadata about the attendee may also be collected. This metadata may, for example, include the attendee's profession, job title, position within an organization, interests, job responsibilities, and so forth.

For example, attendee Kelli will be attending Jan's virtual all-hands meeting. As part of the video summary generation process 200, a dialog box is presented to Kelli asking for approval to opt-in to the video summary generation process 200 which is displayed along with buttons to approve or decline. Kelli agrees and clicks on the approve button to opt-in to the video summary generation process 200. Thereafter, a subsequent dialog box is presented to Kelli with a text field asking for her to enter in her profession. Kelli then enters "software engineer" into the text field.

Then, at 206, meeting attendee notes are gathered from attendees. In embodiments, notes taken by attendees may be collected from the attendees that opted-in previously at 204. As notes are taken by attendees in real-time, time stamps may be added to each note indicating when the note-taker attendee wrote the note. In embodiments, notes may be collected by the video summary generation process 200 in real-time and time stamps affixed as the notes are collected. In other embodiments, the note taking program (e.g., word processor, software program 108) may be instructed by the video summary generation process 200 (e.g., via API call) to add time stamps and then transmit the notes with time stamps over a communication network 116 to, for example, the video summary generation process 200 running on a server 112 which may centrally process the collected notes, as will be described in further detail below. In some embodiments, the notes from attendees may be collected at the end of the meeting or presentation. The end of the meeting or presentation may, for example, be determined by communicating with the virtual meeting software which may send a notification to the video summary generation process 200 that the meeting ended or the video summary generation process 200 may query the virtual meeting software to determine that the meeting ended by receiving an appropriate response from the virtual meeting software.

Continuing the previous example, Kelli takes notes during Jan's presentation. As Kelli takes notes, the word processor she uses adds time stamps to each note Kelli writes per the instructions the word processor received from the video summary generation process 200. After Jan's presentation ends, VirtuaMeeting send a notification to the video summary generation process 200 that the meeting ended and then the video summary generation process 200 may collect Kelli's notes by communicating with Kelli's word processor running on Kelli's computer over a communication network 116. Kelli's word processor then transmits Kelli's notes with time stamps to the video summary generation process 200 running on a central server for processing.

At 208 the gathered notes from the attendees are aggregated. According to at least one embodiment, the notes collected by the video summary generation process 200 may be aggregated in a notes database (e.g., database 114). As part of the aggregation process, the notes may be stored with the anonymous metadata of the note taker collected earlier at 204. Thus, time stamped notes from a note taker may be stored in a database 114 together with the metadata of the note taker. Continuing the prior example, Kelli's anonymous time-stamped notes are stored in a notes database with her software engineer profession as additional metadata together with notes taken by the other attendees that opted-in and took notes with corresponding note-taker metadata.

Next, at 210, the aggregated notes are analyzed. According to at least one embodiment, the aggregated notes are analyzed for common topics. Common topics may be identified based on various NLP algorithms such as BoW, capture classification, and other such algorithms alone or in combination to identify topics that were commonly or frequently noted by attendees as a whole. According to some embodiments, after common topics are identified, temporal analysis may be performed to group notes taken by attendees based on the time stamps recorded previously, as described above. As such, certain topics which appeared more than once within a meeting may have the corresponding notes correctly grouped to the specific instance of the topic. It may be appreciated that in some embodiments, temporal analysis may be performed first before common topics are determined.

Continuing the prior example, during Jan's remarks, Jan mentioned software deployment of application A at the beginning of the meeting (at minute 2 of the meeting) and later (at minute 48 of the meeting) she discusses software deployment of application B. Attendees, such as Kelli, took notes regarding the topic of software deployment at both points in time (i.e., minute 2 and minute 48) during the meeting. By temporally grouping the topics, the notes taken about software deployment of application A are kept separate and identified as distinct from the notes taken about the software deployment of application B.

Additionally, the common topics may be ranked or otherwise ordered. For example, topics may be ranked based on frequency, i.e., if the topic sales was noted by 20% of meeting attendees while the topic of software deployment was noted by 70% of attendees, the software deployment topic would be ranked higher than the topic of sales. As such, topics that are minimally noted will be ranked low and the topics which were noted frequently will be ranked high.

Then, at 212, the analyzed notes are correlated with the video recording of the meeting or presentation. According to embodiments, a variety of methods may be used to correlate note topics to the corresponding point in a video recording of a meeting, including, among other methods, topics-to-text, topics-to-images, temporal correlation, uni-variant correlation, and multi-variant correlation. These methods may be used individually or a combination of correlation methods may be used to correlate the notes to the meeting video. Topics-to-text correlation may rely on speech-to-text conversion of the speaker's speech from audio file to text. The output speech-to-text text may be compared with the common topics identified previously at 210 and based on, for example, semantic similarity between the topics of the speaker and the common topics. According to some embodiments, the speech-to-text output text of the speaker's verbal communication during the meeting may be analyzed to have topics identified similarly to how topics are identified in attendee notes, as described above. A semantic similarity algorithm or other similarity algorithms may be used to analyze the note topics and the speech topics to generate similarity scores. Thereafter, the note topic and speaker discussion topic with the highest semantic similarity score may be determined to correlate. In some embodiments, the semantic similarity score may also need to exceed a predefined threshold value before the topics are determined to correlate.

Topics-to-images may use the results from CNN object detection to determine note topics that correspond with objects presented visually (e.g., images or videos on presentation slides, physical objects held up by the speaker). Thus, the notes topic with the highest semantic similarity to the object detection results may therefore correspond. For example, Jan may state during the meeting "I would like introduce you to our latest breakthrough" and then hold up a red widget. Kelli, and other note-takers may make notes about a red widget. While analyzing Jan's speech may not have sufficient similarity to correlate with the notes about a red widget since Jan never spoke the words "red widget," image analysis may identify the object Jan held up as a red widget. The subsequent topics-to-images correlation would then correlate Kelli's red widget notes with the point in the meeting video when Jan held up the object identified as a red widget.

Temporal correlation may use the time stamps corresponding with notes (and the topics the notes are correlated with) to match up with the time in the video. For instance, when Kelli notes software deployment of application A at a time stamp of 2 minutes, the corresponding video at 2 minutes into the meeting is the point in the video that Kelli's notes correlate to. Additional processing may be used to synchronize the time stamps in the notes to the video to account for lag in communication networks 116 or the time the note-taker needs to process the point made in the presentation and type out the relevant note. Further, the time when the meeting recording and the notes are taken may not match (e.g., the video recording may begin 5 minutes before the meeting starts so Kelli's note that is time stamped minute 2, would actually correlate to minute 7 of the video). To correct for such discrepancies, other correlation methods may be used to determine a time offset (e.g., topics-to-speech may be used to find the first topic mentioned in the notes within the video and determine the time difference between the time stamp of the notes relating to the topic and the time at which the topic is mentioned in the video based on the speech-to-text transcript time stamp) which may be added to or removed from the note time stamp to correlate the notes from a note-taker with the proper point in the video of the meeting.

In the case where a comment or topic (e.g., regarding sales) by the speaker correlates to only one portion of the presentation video (i.e., uni-variant correlation), then the topic is correlated or mapped to the one portion of the presentation video and the correlating step is complete. However, in the case where a comment correlates to potentially multiple portions of the presentation video (i.e., multi-variant correlation), then additional processing may be required. According to some embodiments, Term Frequency-Inverse Document Frequency (TF-IDF) may be used to perform multi-variant correlation. TF-IDF may measure the number of times that a categorized object, person, or environment appears or is discussed in each correlated portion of presentation video. TF-IDF may then measure the relevance of each instance to derive which of the multi-variant correlations is the most relevant to the note topic and select the most relevant and the correlation point.

For example, if Kelli wrote a note regarding software deployment and Jan discussed software deployment at minute 2, minute 48, and minute 57, of the meeting, TF-IDF analyzes and ranks the three portions of video to determine that Jan's discussion at minute 48 is the most relevant to Kelli's note and thus correlates Kelli's notes to the video portion of Jan's presentation at minute 48.

Additionally, in some embodiments, the runtime of the portion of video correlated to note topics may be determined. Portion length may, for example, be determined by analyzing the speech of the speaker to determine when sufficient similarity thresholds are no longer met (i.e., the speaker's discussion has moved away in relevance from the note topic sufficiently that the semantic similarity score has dropped below a threshold, thereby indicating the speaker has moved on to a different subject). Other methods may be employed, such as, for example, determining that the displayed slide during the presentation has changed via image analysis, if a sufficiently long pause between speaking was detected, or if a different voice is detected indicating a different speaker is now presenting, and so forth. It may be appreciated that other methods may be used to determine the length of the video portion that is relevant to the topic and that a combination of methods may be used, depending on implementation.

At 214, a video summary of the presentation is generated. According to at least one embodiment different types and lengths of video summaries may be dynamically generated. In some embodiments, a general summary may be generated based on the top ranked highlights determined by the attendee notes, collectively. According to some embodiments, personalized summaries may be generated that are tailored to characteristics of the summary video viewer.

For general summary highlight videos, different metrics for defining the videos may be used. For example, in some implementations, summary videos may be defined by a predetermined lengths (e.g., 2 minutes). In other embodiments, the video length may be defined based on a percentage of the total presentation length (e.g., the summary video length is, at most, 10% of the total meeting length). According to other embodiments, summary video length may be defined by the amount of common topics exceeded frequency thresholds (e.g., note topics that were present in 50% or more attendee notes). Based on these limits, the highest ranked note topics (which ranking was described above with respect to 210) may be selected and the corresponding video portions combined to form the summary video. The processes of selecting the highest tanked note topics may be repeated until the appropriate limit (e.g., maximum predetermined time) has been met. In such embodiments, the length of the portion of video correlated with the topic may have been determined previously (e.g., at 212), thus the time the portion would add to the summary video runtime may be known and a determination may be made if the portion can be added without exceeding the predefined limit (e.g., 2 minute total runtime for the video). In some embodiments, if appending the next highest ranked topic to the summary video would exceed a predefined time limit, the next highest ranked topic may be selected if that portion would allow the summary video to remain within the predefined time limit.

According to at least one embodiment, the above topic selection process may be used to generate an initial version of the summary video which may then be altered by replacing video portions in the summary video with video portions from topics not initially selected in response to collected viewer feedback, as will be described below in further detail.

According to some embodiments, multiple summary videos with different runtime lengths may be generated, thus allowing a viewer to select which length to watch based on the viewer's interest. For example, a short summary of 2 minutes, a medium summary of 5 minutes, and a long summary of 8 minutes may be generated per the method described above. When a viewer wishes watch a summary video, the video summary generation process 200 may present a GUI that allows the viewer to choose from the summary video options (e.g., the short summary, medium summary, long summary, and unabridged meeting video) and also optionally provide information about the runtime of each video and list the topics selected for each video. In other embodiments, the user may be able to customize or define their own length for a video summary, for example, by pulling a slider in a GUI to define a custom time length desired by the viewer.

According to some embodiments, in addition to choosing a length, the viewer may customize the topics and detail or length of time for certain topics that are more relevant or interesting to the viewer, thereby creating a personalized summary. Metadata about the viewer (e.g., job title, responsibilities, position within an organization, and so on) may be compared with the metadata collected about the attendee note-takers as described previously at 204 to weigh note topics for ranking and subsequent inclusion in the summary video. As such, notes taken by attendees with similar backgrounds to the viewer may be weighted heavier, and therefore have more influence on the topics included in the summary video as opposed to notes from attendees with dissimilar backgrounds. In some embodiments, the viewer may be presented with a GUI which lists available topics together will selectable indicators (e.g., a checkbox) such that the viewer may select the topics that will be included in a personalized video summary. According to some embodiments, some topics may be presented to the user preselected based on the viewer's metadata. Thereafter, the user may review and change the topic selection as they desire. In some embodiments, as the user selects topics to include, a real-time runtime total for the summary video may be displayed to the viewer. For example, if the viewer selects the topic "sales," the total summary video runtime of 2 minutes may be displayed. If the viewer subsequently selects the topic "widget," the total summary video runtime may then increase to 5 minutes. Thus, the viewer may receive instant feedback regarding the summary video length that would be generated and tailor the video as the viewer wishes.

In some embodiments, the viewer may have a slider or other GUI element to use to indicate the amount of depth for individual topics the user wishes to have covered in a summary video. Consequently, the video summary generation process 200 may display, for example, a slider next to each topic that the user may select and the user may drag the slider to one side to increase the time the topic is covered in the summary video or drag the slider to the other side to decrease the time a topic is covered. Adding video portions to or removing video portions from the summary video based on the viewer's input may be implemented by using the data generated and the ranking of video portions described above with respect to multi-variant correlation whereby multiple video portions related to a topic were ranked. As the viewer indicates a desire to have more highlights regarding a specific topic, the next highest ranked video portion related to the topic may be selected and added to the summary video. Likewise, if the user instead decides to have less detail regarding a topic, the lowest ranked video portion related to the topic and designated for inclusion in the summary video may be removed.

Once the topics and desired detail within the predefined limits are determined, the appropriate video portions may be snipped from the original presentation video and then combined to create the summary video. According to at least one embodiment, in order to appropriately snip video portions, audio analysis may be performed to find pauses or gaps when the speaker talks in order to avoid cutting a speaker off in the middle of a statement, thereby creating a better resulting video and user experience. It may be appreciated that other methods may be used to identify the end of video portions in order to appropriately snip the portion, as described above with respect to 212.

Next, at 216, feedback regarding the generated video summary is collected. In embodiments, metrics are collected regarding the part of the generated video summary viewers watch, or do not watch, and dynamically adjust the summary videos based on the collected feedback. In some embodiments, maximum frequency counts, minimum frequency counts, and manual feedback may be collected to dynamically create and alter video summaries. If a specific part of the summary video or the full summary video watched frequently (i.e., the maximum frequency count is high or above a threshold), then the video summary generation process 200 may keep the specific part in the summary or keep the full summary intact. Further, the video summary generation process 200 may add frequently watched portions to other video summaries (e.g., a portion that is included in the medium and long summary videos that is frequently watched may be added to the short video in place of a portion that is not frequently watched). Likewise, if a specific part of the summary video or the full summary video seldom watched (i.e., the minimum frequency count is low or below a threshold), then the video summary generation process 200 may take the part or portion of the video out of the summary and optionally replace the seldom watched part with the next highest ranked topic. In some embodiments, manual feedback may be collected from the viewer while or after the viewer watches the summary video. For example, the user may be able to click a "thumbs up" or "thumbs down" button at points in the summary video to indicate portions the viewer liked or did not like. Based on the collected feedback, the summary videos may constantly evolve by adding and removing portions of video to capture the best portions from the original presentation or meeting.

It may be appreciated that FIG. 2 provides only an illustration of one embodiment and does not imply any limitations with regard to how different embodiments may be implemented. Many modifications to the depicted embodiment(s) may be made based on design and implementation requirements.

For example, in some embodiments the video summary generation process 200 may detect the context and relationship of those involved with the presentation to appropriately apply or trigger note aggregation. For example, in a university setting, a professor may use the video summary generation process 200 to aggregate student notes in order to summarize recording material. On the other hand, it may be inappropriate for a salesman making a pitch to aggregate and have access to notes from potential clients.

In another example, some embodiments of the video summary generation process 200 include prioritized hierarchy of summary topics and consumption methods. In embodiments, the video summary generation process 200 may aggregate notes to provide video summaries and prioritize those summaries based on topic, job role, interest, and so forth to propose the proper summary to a user, including consumption method (i.e., summarized notes or video segments) with alternatives for other highly significant summaries (e.g., Priority 1—topic: automation, time 4:07-12:08, job role: automation seller; Priority 2—topic: integration, time 15:05-21:38, job role: automation seller).

As described in embodiments above, the video summary program 110*a* and 110*b* may improve the functionality of a computer or other technology by automatically generating summary highlight videos from aggregated notes that may be personalized for individual viewers based on individual interests and dynamically update the videos, thereby creating new summary videos constantly in response to viewer feedback. As such, dynamic, automatically generated videos are created that are better tailored to a viewer and therefore are more efficient with computer-related resources (compute resources, network resources, and so forth) since the more relevant portions of video content (which is often expensive in terms of computer resources) are stored, transmitted, and displayed to a viewer instead of an entire video of a presentation or meeting where the viewer may skip over portions and the resources used to cache or store the uninteresting portions is not wasted.

Figure 3:
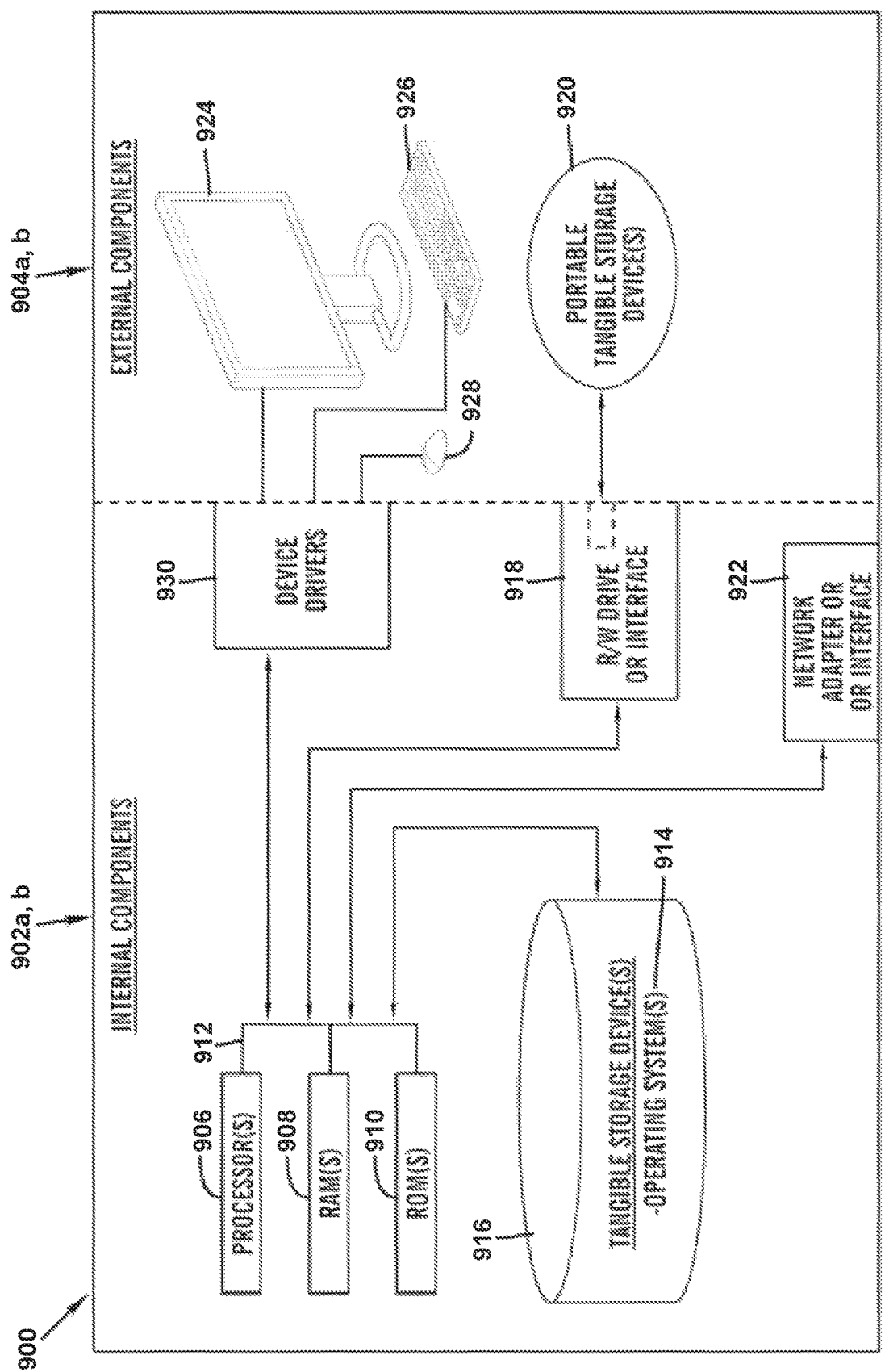
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 3. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the video summary program 110*a* in client computer 102, and the video summary program 110*b* in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a RAY drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the video summary program 110*a* and 110*b* can be stored on one or more of the respective portable computer-readable tangible storage devices 920, read via the respective RAY drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the video summary program 110a in client computer 102 and the video summary program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the video summary program 110a in client computer 102 and the video summary program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, RAY drive or interface 918 and network adapter or interface 922 comprise hardware and software (stored in storage device 916 and/or ROM 910).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
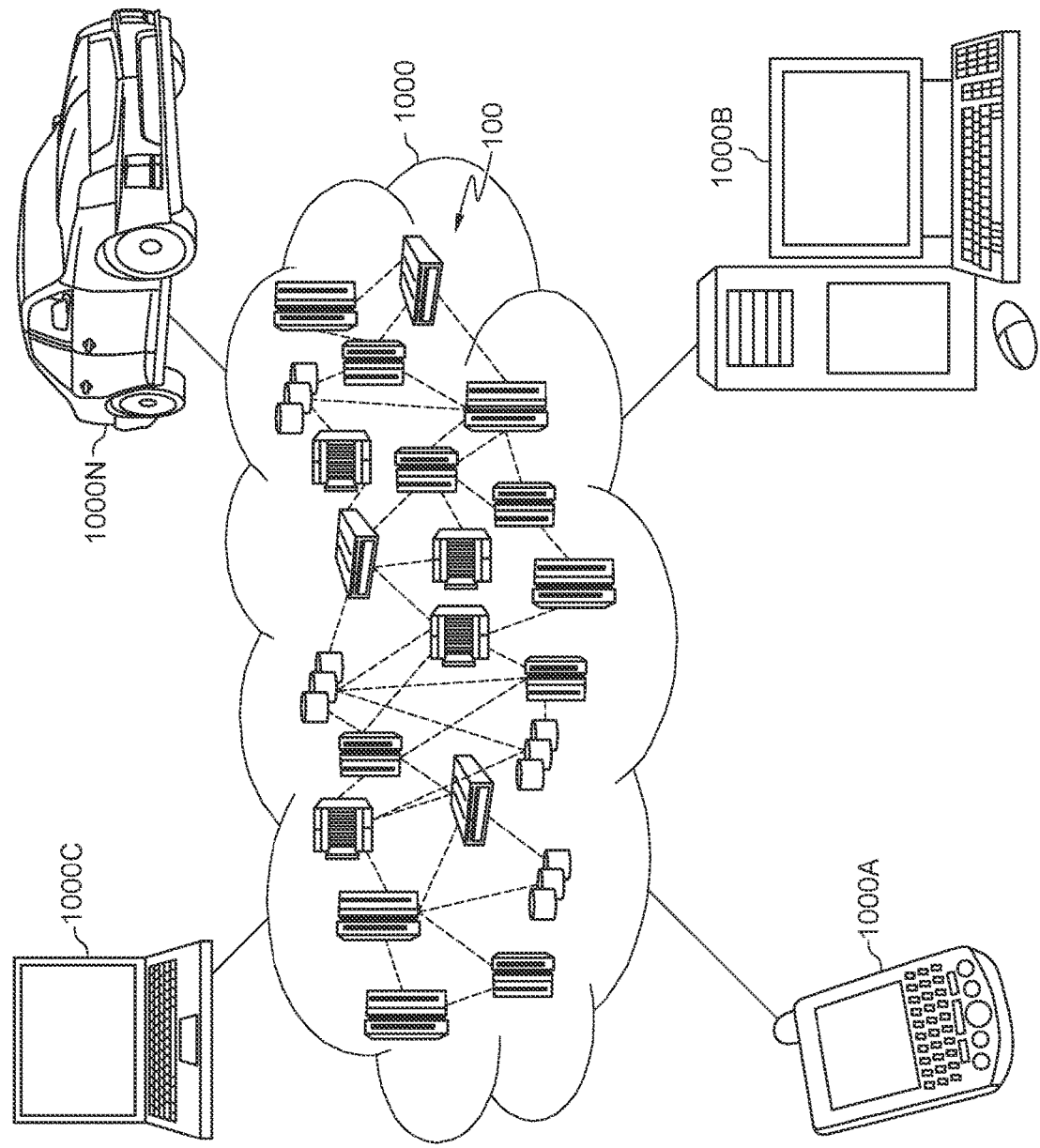
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
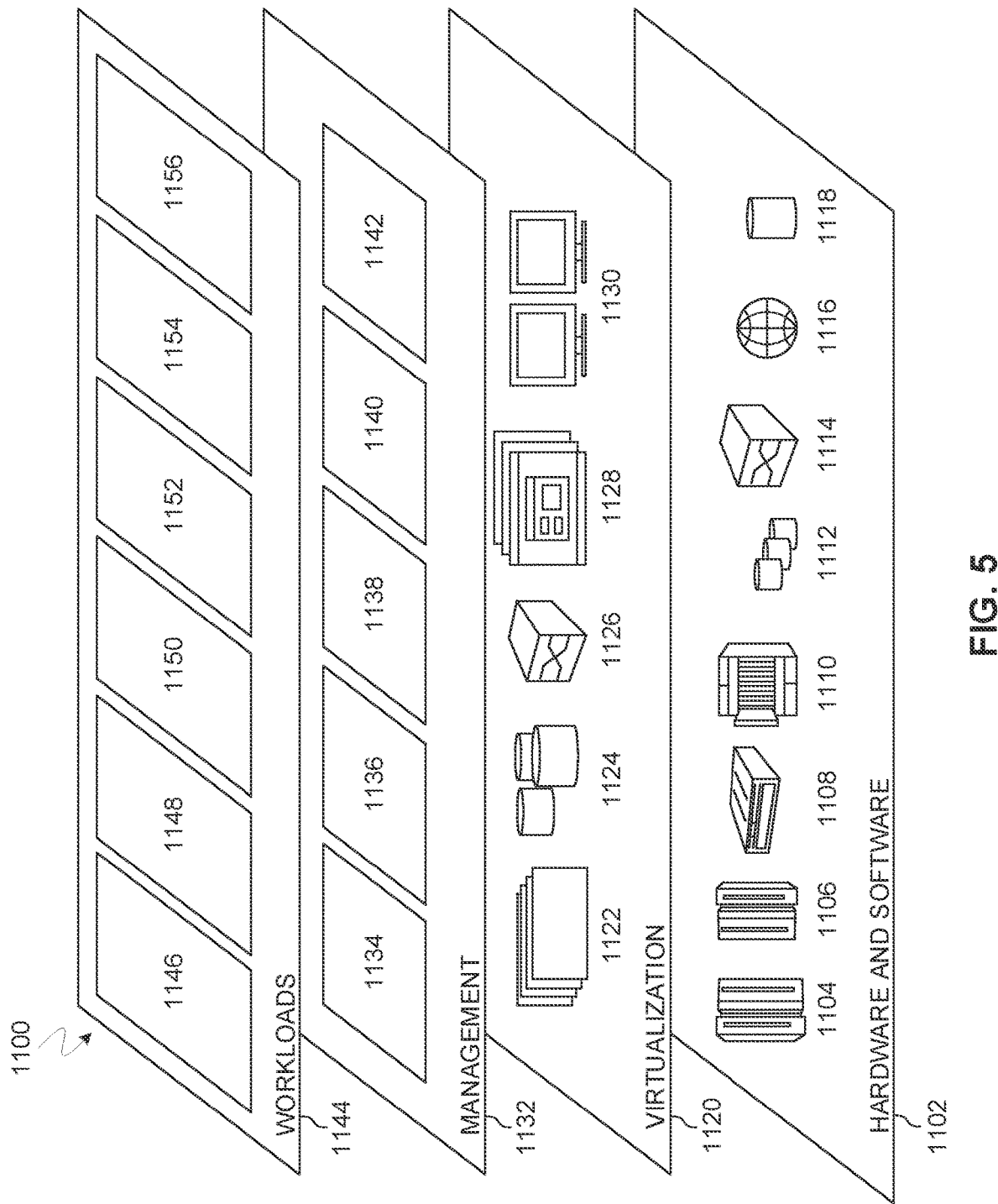
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and video summary generation 1156. A video summary program 110a, 110b provides a way to create a video summary of a presentation based on analyzing attendee notes.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for generating a summary video from a plurality of attendee notes, the method comprising:

collecting attendee metadata for each attendee from a plurality of attendees associated with a presentation;

collecting viewer metadata for a viewer;

collecting the plurality of attendee notes from the plurality of attendees of the presentation;

analyzing the collected plurality of notes to identify a plurality of common note topics, wherein analyzing the collected plurality of notes to identify the plurality of common note topics further comprises assigning more weight to topics from the plurality of attendee notes created by one or more attendees with relevant attendee metadata to the viewer based on comparing the collected attendee metadata to the collected viewer metadata;

correlating the identified plurality of common note topics to a plurality of portions in a presentation video of the presentation; and generating the summary video by combining the correlated plurality of portions in the presentation video.

2. The computer-implemented method of claim 1, wherein collecting the plurality of attendee notes from the plurality of attendees of the presentation occurs in response to receiving attendee approval to opt-in to note collection.

3. The computer-implemented method of claim 1, further comprising:

requesting feedback from one or more viewers in response to playing the generated summary video;

receiving viewer feedback; and altering the generated summary video based on the received viewer feedback.

4. The computer-implemented method of claim 1, wherein analyzing the collected plurality of notes to identify the plurality of common note topics comprises identifying a plurality of topics within the collected plurality of notes, ranking the identified plurality of topics based on a frequency, and selecting a set of highest ranked topics as the plurality of common note topics.

5. The computer-implemented method of claim 1, wherein correlating the identified plurality of common note topics to the plurality of portions in the presentation video of the presentation comprises identifying a video portion topic associated with a portion within the plurality of portions and determining that the identified video portion topic is sufficiently similar to a common note topic within the plurality of common note topics.

6. The computer-implemented method of claim 5, wherein identifying the video portion topic associated with the portion within the plurality of portions comprises using an algorithm selected from the group consisting of an image analysis algorithm and a speech-to-text algorithm.

7. A computer system for generating a summary video from a plurality of attendee notes, comprising:
one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
collecting attendee metadata for each attendee from a plurality of attendees associated with a presentation;
collecting viewer metadata for a viewer;
collecting the plurality of attendee notes from the plurality of attendees of the presentation;
analyzing the collected plurality of notes to identify a plurality of common note topics, wherein analyzing the collected plurality of notes to identify the plurality of common note topics further comprises assigning more weight to topics from the plurality of attendee notes created by one or more attendees with relevant attendee metadata to the viewer based on comparing the collected attendee metadata to the collected viewer metadata;
correlating the identified plurality of common note topics to a plurality of portions in a presentation video of the presentation; and
generating the summary video by combining the correlated plurality of portions in the presentation video.

8. The computer system of claim 7, wherein collecting the plurality of attendee notes from the plurality of attendees of the presentation occurs in response to receiving attendee approval to opt-in to note collection.

9. The computer system of claim 7, further comprising:
requesting feedback from one or more viewers in response to playing the generated summary video;
receiving viewer feedback; and
altering the generated summary video based on the received viewer feedback.

10. The computer system of claim 7, wherein analyzing the collected plurality of notes to identify the plurality of common note topics comprises identifying a plurality of topics within the collected plurality of notes, ranking the identified plurality of topics based on a frequency, and selecting a set of highest ranked topics as the plurality of common note topics.

11. The computer system of claim 7, wherein correlating the identified plurality of common note topics to the plurality of portions in the presentation video of the presentation comprises identifying a video portion topic associated with a portion within the plurality of portions and determining that the identified video portion topic is sufficiently similar to a common note topic within the plurality of common note topics.

12. The computer system of claim 11, wherein identifying the video portion topic associated with the portion within the plurality of portions comprises using an algorithm selected from the group consisting of an image analysis algorithm and a speech-to-text algorithm.

13. A computer program product for generating a summary video from a plurality of attendee notes, comprising a computer-readable storage medium having program instructions embodied therewith, the program instructions executable by a processor to cause the processor to perform a method comprising:
collecting attendee metadata for each attendee from a plurality of attendees associated with a presentation;
collecting viewer metadata for a viewer;
collecting the plurality of attendee notes from the plurality of attendees of the presentation;
analyzing the collected plurality of notes to identify a plurality of common note topics, wherein analyzing the collected plurality of notes to identify the plurality of common note topics further comprises assigning more weight to topics from the plurality of attendee notes created by one or more attendees with relevant attendee metadata to the viewer based on comparing the collected attendee metadata to the collected viewer metadata;
correlating the identified plurality of common note topics to a plurality of portions in a presentation video of the presentation; and
generating the summary video by combining the correlated plurality of portions in the presentation video.

14. The computer program product of claim 13, wherein collecting the plurality of attendee notes from the plurality of attendees of the presentation occurs in response to receiving attendee approval to opt-in to note collection.

15. The computer program product of claim 13, further comprising:
requesting feedback from one or more viewers in response to playing the generated summary video;
receiving viewer feedback; and
altering the generated summary video based on the received viewer feedback.

16. The computer program product of claim 13, wherein analyzing the collected plurality of notes to identify the plurality of common note topics comprises identifying a plurality of topics within the collected plurality of notes, ranking the identified plurality of topics based on a frequency, and selecting a set of highest ranked topics as the plurality of common note topics.

17. The computer program product of claim 13, wherein correlating the identified plurality of common note topics to the plurality of portions in the presentation video of the presentation comprises identifying a video portion topic associated with a portion within the plurality of portions and determining that the identified video portion topic is sufficiently similar to a common note topic within the plurality of common note topics.

* * * * *